United States Patent [19]

Miyake et al.

[11] Patent Number: 4,748,555
[45] Date of Patent: May 31, 1988

[54] CONTROL UNIT FOR A MOVING BODY

[75] Inventors: Hiroyuki Miyake, Kawasaki; Masanori Miyata; Akihiro Kasiwabara, both of Yokohama, all of Japan

[73] Assignee: Canon Kabushiki Kaisha, Tokyo, Japan

[21] Appl. No.: 602,009

[22] Filed: Apr. 19, 1984

[30] Foreign Application Priority Data

Apr. 25, 1983 [JP] Japan .................................. 58-71542

[51] Int. Cl.⁴ .............................................. G05B 19/00
[52] U.S. Cl. .................................... 364/174; 364/142; 318/567; 318/632
[58] Field of Search ............... 364/167, 170, 142, 174, 364/176, 513, 426; 318/561, 567, 568, 569, 632

[56] References Cited

U.S. PATENT DOCUMENTS

| 3,519,805 | 7/1970 | Booth | 364/426 |
|---|---|---|---|
| 3,639,754 | 2/1972 | Kovalcik | 364/426 |
| 3,934,125 | 1/1976 | Macano | 364/426 |
| 4,066,230 | 1/1978 | Nohmi | 364/426 |
| 4,350,941 | 9/1982 | McClure et al. | 364/474 X |
| 4,362,978 | 12/1982 | Pollard et al. | 364/513 X |
| 4,506,321 | 3/1985 | Comstock et al. | 364/174 |

Primary Examiner—Jerry Smith
Assistant Examiner—Allen MacDonald
Attorney, Agent, or Firm—Fitzpatrick, Cella, Harper & Scinto

[57] ABSTRACT

A control unit for a moving body such as an optical system of a copying machine includes detection means for detecting a moving status of the moving body and control means for controlling the movement of the moving body in accordance with a detection output of the detection means. The control means contains data corresponding to the detection output to control the moving body in accordance with the detection output.

12 Claims, 16 Drawing Sheets

CONTROL UNIT FOR A MOVING BODY

BACKGROUND OF THE INVENTION

1. Field of the Invention

The present invention relates to a control unit for a moving body for controlling the moving body in accordance with a predetermined program, and more particularly to a control unit suitable for controlling a high speed movement of a reciprocating optical system of a copying machine.

2. Description of the Prior Art

In the past, when a position of a moving body is to be controlled, there have been various difficulties in controlling both a acceleration and a velocity. As an example, a speed control of a moving optical system of a copying machine is discussed below.

The moving optical system is usually controlled only in an exposure excursion (i.e. in a forward movement) and not controlled in a reverse or return movement and during stopping. However, when copy speed is to be increased in such an arrangement, an impact at the reversal of the moving optical system influences the exposure process and results in image vibration. If the impact at the reversal is too large, an original sheet illumination lamp which is moved in unison with the moving optical system would be subject to breakage.

Prior art control systems for the moving optical system are described below.

In a first system, two clutches, one for forward movement and the other for backward movement, are used and the activation and the deactivation of those clutches are controlled to effect a reciprocal movement. In the forward movement, the forward clutch is activated to effect a constant velocity drive, and in the backward movement, the forward clutch is deactivated and the backward clutch is activated to effect a backward constant velocity drive.

In such an arrangement, since the forward and backward movements are attained by the activation and the deactivation of the clutches, the acceleration imparted to the movable optical system exceed 10 Gs. The impact due to the forward and backward movements influences the copying machine and it not only results in the vibration of the image but also shortens the lifetime of the copying machine. Further, the noise and the impact at the reversal are not pleasant for a user.

However, this arrangement has an advantage that a scan distance of the movable optical system can be set to a desired distance because the reciprocal movement is controlled by an electrical signal. Thus, it can quickly return the moving optical system depending on a copy size. This system is a main system of the currently available systems but the copy speed is limited to approximately 50 sheets per minute.

In a second system, a direction of rotation of a DC motor is reversed to effect the reciprocal movement of the moving optical system. The forward and backward movements are attained by changing a polarity of a voltage applied to the DC motor, and the constant velocity control is attained by a phase locked loop control.

In this arrangement, while the forward and backward movements of the moving optical system are attained by the on/off control, it has an advantage that the impact is relieved by the inertia of the motor, contrary to the first system described above.

However, during the acceleration and the backward acceleration, the full voltage is applied to the DC motor and no velocity control is effected. Accordingly, an overrun and a time lag at the switching time of the forward and backward movements vary depending on a variation of the friction resistance of a guide rail, the variation of an output and torque characteristic of the DC motor and a fluctuation of the power supply voltage. As a result, copy performance (number of sheets per minute) of the copying machine varies.

Furthermore, while the DC motor used in this arrangement is suitable for the constant velocity rotation, the control in the acceleration and the deceleration is hard to attain for the following reasons.

(a) When an equi-acceleration motion is to be imparted to the moving optical system, a torque output of the DC motor must be kept constant. Accordingly, it is necessary to vary the input voltage Vin in accordance with rotating speed as shown in FIG. 1. Therefore, when the acceleration is to be changed to accelerate or decelerate the moving optical system, complex control is required.

(b) When the rotating speed of the DC motor is low or the direction of rotation of the DC motor is to be reversed, a large current flows as shown in FIG. 2. Therefore, a big power supply is required.

In a third system shown in FIG. 3 (which is similar to that disclosed in FIG. 5 of U.S. Pat. No. 4,120,578), the optical system is reciprocally driven by a cam. The position and the velocity in the forward and backward movements are controlled by a contour curve of the cam 84. Since it can uniquely define the degree of acceleration/deceleration, the position of the reversal and a home position, the smooth control from the constant velocity drive to the backward drive is attained.

Numeral 66 in FIG. 3 denotes a reciprocating optical system, numeral 64 denotes a drive belt, numeral 80 denotes a fixed end of the drive belt, numeral 83 denotes a cam follower and numeral 84 denotes the cam.

However, since the stroke of the moving optical system is uniquely defined by the contour curve of the cam, the moving optical system is full-stroke driven even when a copy size is small. As a result, the copy speed cannot be increased and the lifetime of the copying machine is shortened by the extra physical movement.

Further, this arrangement requires a large scale mechanism and hence a high cost.

SUMMARY OF THE INVENTION

It is an object of the present invention to eliminate the above-mentioned drawbacks.

It is another object of the present invention to provide a control unit which can exactly control the movement of a moving body.

It is another object of the present invention to provide a control unit for a moving body which can smoothly move the moving body such as an optical system forwardly and backwardly.

It is other object of the present invention to provide a control unit for a moving body which controls a velocity and an acceleration of the moving body in accordance with a position of the moving body so that the moving body can be smoothly and rapidly moved.

It is a further object of the present invention to provide a control unit which can precisely control the movement of an optical system to form a high quality of image.

The other objects of the present invention will be apparent from the following description of the invention.

DETAILED DESCRIPTION OF THE PREFERRED EMBODIMENTS

Figure 1:
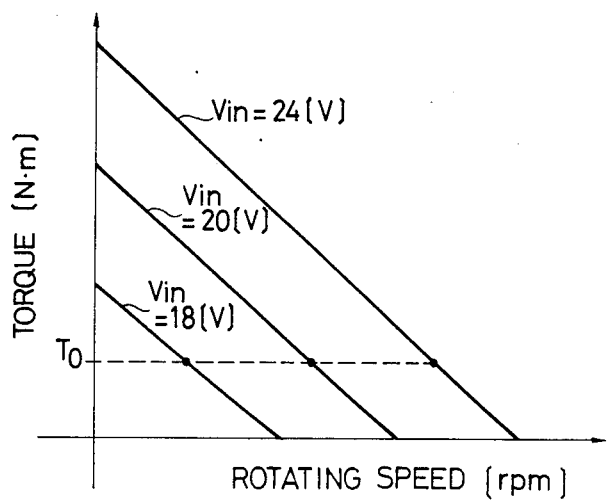
FIGS. 1 and 2 show characteristics of a DC motor.
Figure 2:
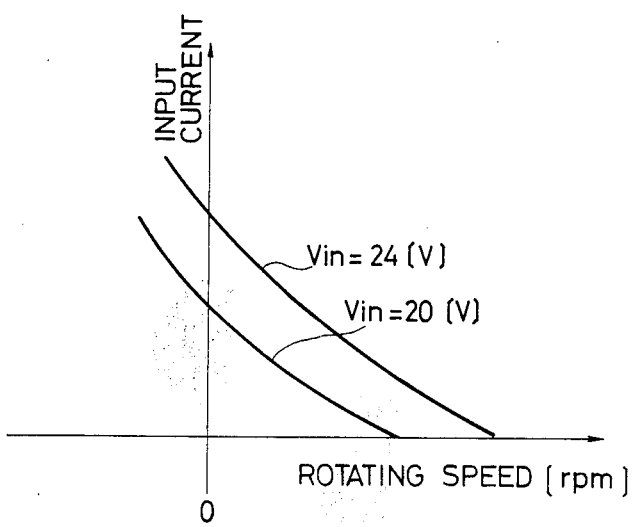
Figure 3:
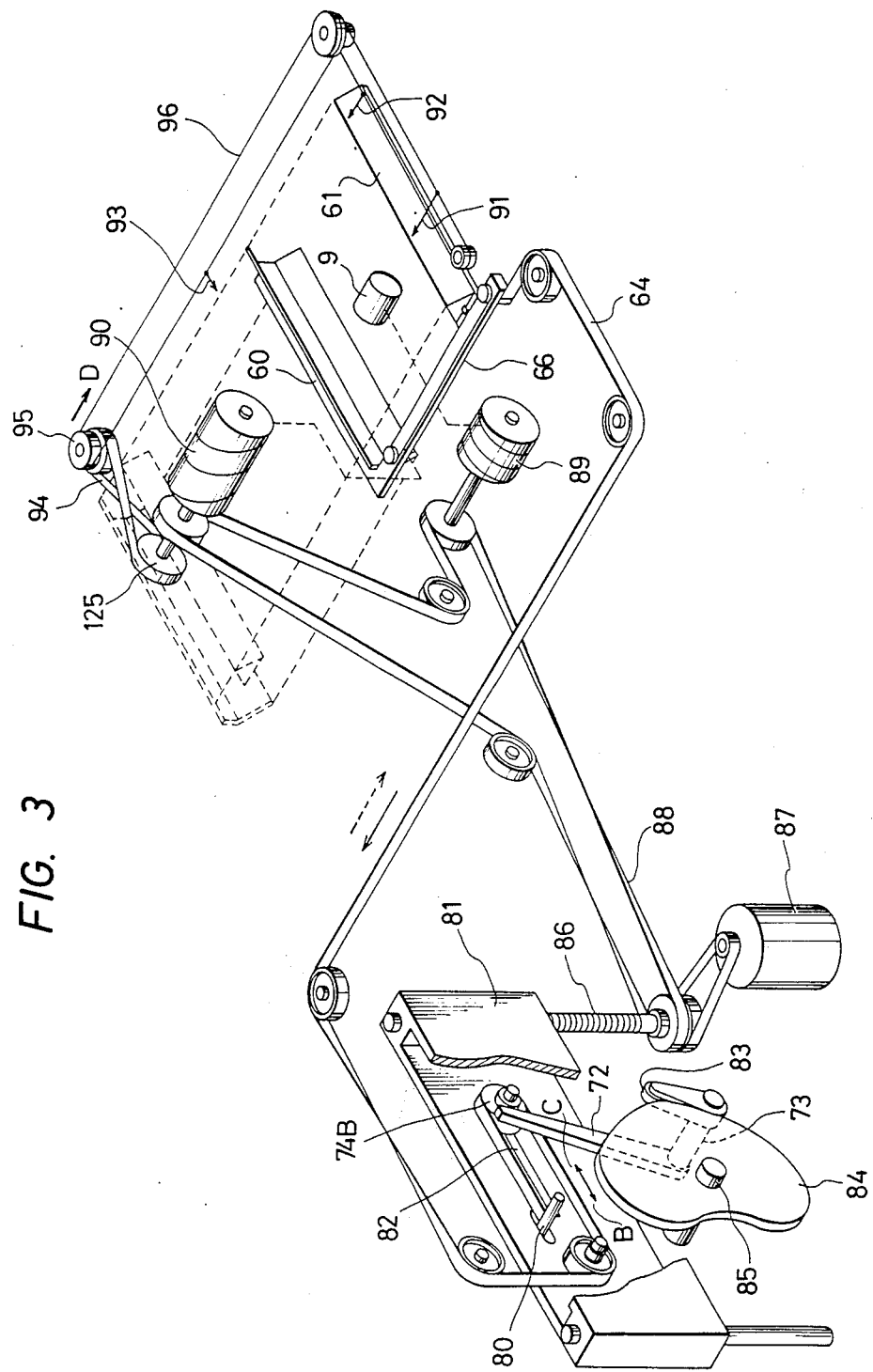
FIG. 3 shows a mechanism of a known copying machine.
Figure 4:
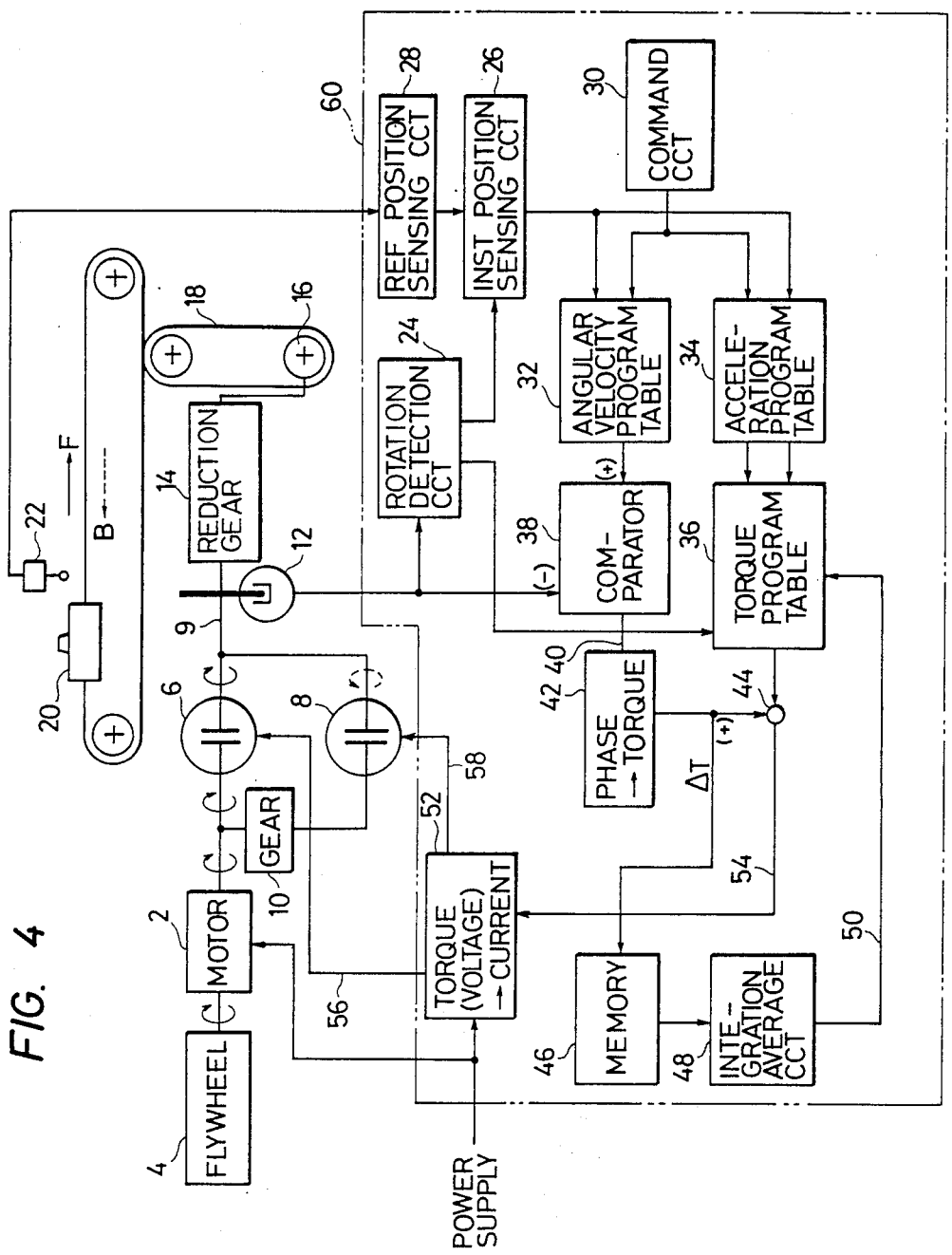
FIG. 4 shows a first embodiment of the present invention.

FIG. 4 shows a control unit for a moving optical system of a copying machine in accordance with the present invention. Numeral 2 denotes a constant rotating speed motor, numeral 4 denotes a flywheel mounted on a shaft of the motor 2, numeral 6 denotes a forward clutch which uses a powder clutch or a hysteresis clutch connected to the shaft of the motor 2, numeral 8 denotes a backward clutch connected to the shaft of the motor 2 through a reversal transducing gear 10, numeral 12 denotes an encoder connected to a common output shaft of the clutches 6 and 8 for sending out a two-phase clock signal representing a rotating speed of the common output shaft, numeral 14 denotes a reduction gear for transmitting a rotation output of the forward clutch (F clutch) 6 or the backward clutch (B clutch) 8 to a pulley 16, numeral 18 denotes a wire coupled to the output pulley 16 to forwardly (arrow F) or backwardly (arrow B) move a moving optical system 20, numeral 22 denotes a reference position sensor for detecting when the moving optical system 20 in the forward movement passes through a reference position (for example, a position at which a leading edge of an original sheet starts to be projected to a photosensitive drum in an exposure scan, that is, a leading edge of an image), numeral 24 denotes a rotation detector for detecting a rotation direction and a rotation speed of the clutch output shaft 9 in response to the clock signal supplied from the encoder 12, and numeral 26 denotes a position detector for detecting an instantaneous position of the moving optical system 20 in accordance with an output signal of a reference position detector 28 which receives an output signal of the reference position sensor, and an output signal of the rotation detector 24. In order to detect an exact position, it is preferable that the encoder 12 is arranged upstream (on the side of the clutch) of the reduction gear 14.

Numeral 30 denotes a command circuit for issuing command signals on start, the number of copies and a copy magnification, and it is connected to an operation panel (not shown) of the copying machine. Numeral 32 denotes an angular velocity program table RAM or ROM from which an angular velocity corresponding to position information supplied from the position detector 26 and the command supplied from the command circuit 30 is read out. The angular velocity program table includes a variable frequency oscillation, a frequency of which is switched in accordance with the table. The angular velocity program is a shaft rotation angular velocity (radians per second) of the clutch output shaft 9 corresponding to a velocity (meters per second) preset for the moving optical system 20. Numeral 34 denotes an acceleration program table RAM from which an acceleration corresponding to the position information supplied from the position detector 26 and the command supplied from the command circuit 30 is read out, as is the angular velocity program table 32. The acceleration program is a shaft rotation acceleration (radians per seconds square) of the clutch output shaft 9 corresponding to an acceleration (meters per seconds square) preset for the moving optical system 20.

Numeral 36 denotes a torque conversion table for converting the acceleration program to a clutch transfer torque (which will be explained in connection with FIGS. 5, 6 and 7) in synchronism with the output signal from the rotation detector 24. Unlike the angular velocity program table 32 and the acceleration program table 34, the torque conversion table 36 can update the stored values in accordance with a torque offset signal 50 (to be described later). A ROM which contains the torques corresponding to the acceleration program and a RAM which can correct the data in the ROM in response to the torque offset signal 50 are combined to form the torque conversion table 36.

Numeral 38 denotes a comparator which compares the clock signal supplied from the encoder 12 with the angular velocity program to produce a phase difference signal 40 which represents the difference between the actual rotation angular velocity of the clutch output shaft 9 and the predetermined theoretical angular velocity. Numeral 42 denotes a phase torque conversion circuit which converts the phase difference signal 40 to a corresponding compensation torque (voltage) $\Delta T$. The phase torque conversion circuit 42 may be a table. Whenever the clock signal is supplied from the encoder 12, the compensation torque is supplied to an adder 44 and stored in a memory 46. The compensation torques $\Delta T$ stored in the memory 46 are accumulated by a predetermined times (for example, a number of times corresponding to the number of clocks required to reciprocate moving optical system 20 ten times), and an average thereof is fed back to the torque conversion table as the torque offset signal.

Numeral 52 denotes a voltage-current conversion circuit which converts a torque control voltage (a sum of the torque read from the torque program and the compensation torque $\Delta T$) 54 supplied from the adder 44 to an F clutch control current 56 or a B clutch control current 58.

Figure 5:
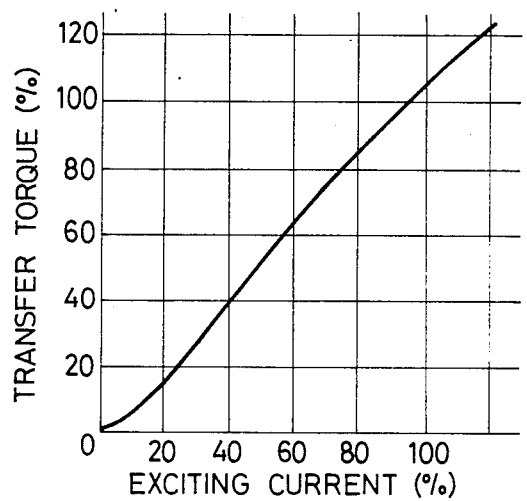
FIGS. 5 and 6 show characteristics of a powder clutch shown in FIG. 4.
Figure 6:
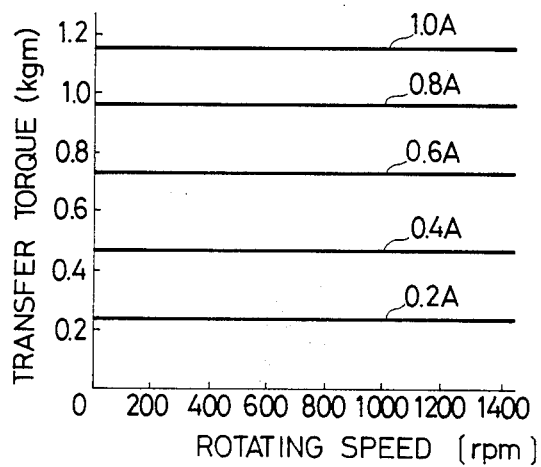

FIG. 5 shows an example of a transfer torque versus exciting current characteristic when powdered clutches are used as the F clutch 6 and the B clutch 8. FIG. 6 shows an example of a transfer torque versus slip rotating speed or a relative rotating speed between the input and output shafts, of the powder clutch. As seen from FIGS. 5 and 6, the powder clutch provides a transfer torque which is substantially proportional to the exciting current (that is, the F clutch control current 56 or the B clutch control current 58), and a constant transfer torque is provided irrespective of the relative rotating speed between the input and output shafts. Similar characteristics are obtained when hysteresis clutches are used as the F clutch 6 and the B clutch 8.

Figure 7:
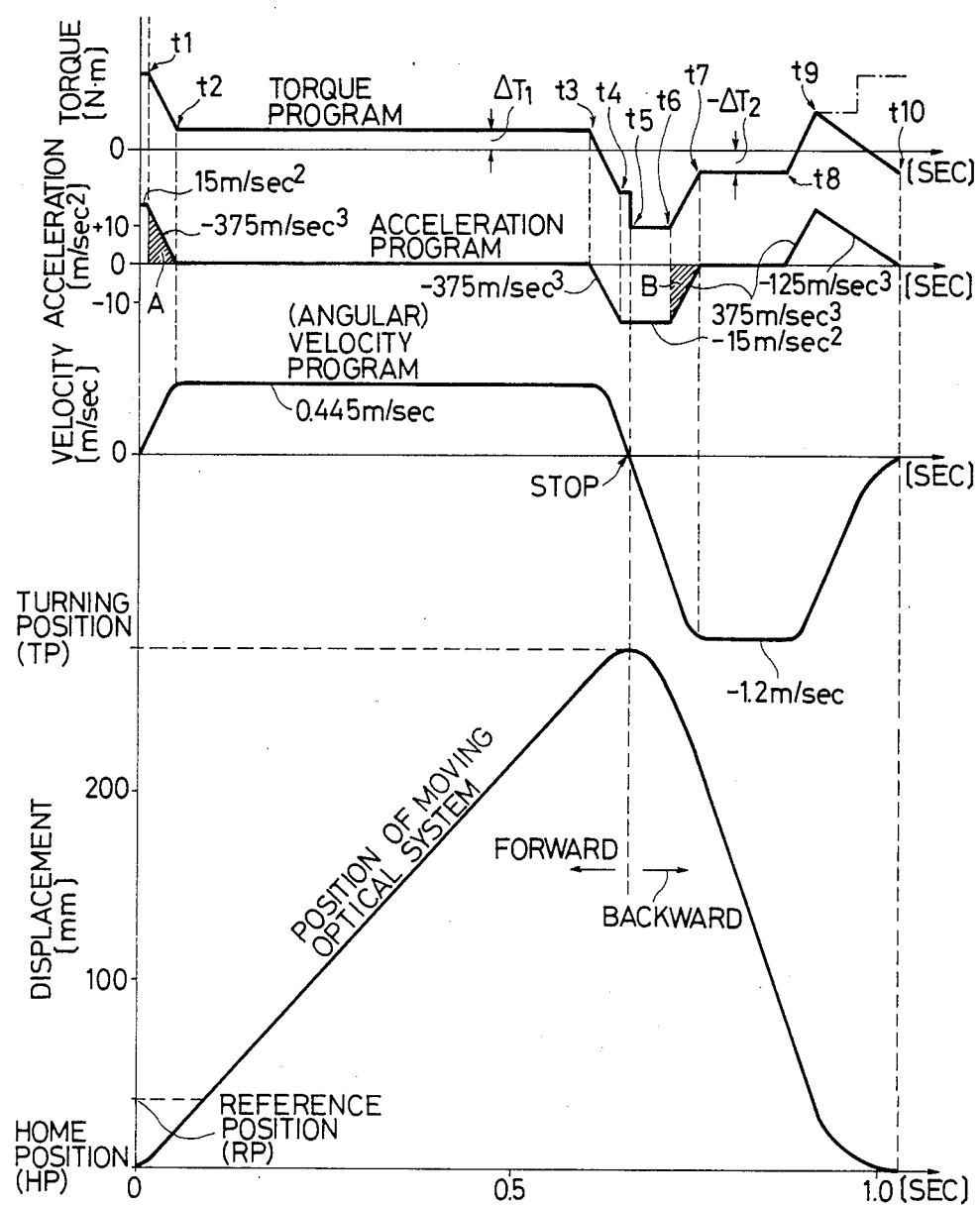
FIG. 7 shows a control program for a moving optical system shown in FIG. 4.

FIG. 7 is a graph showing the relationships between the torque program and the acceleration program, the angular velocity program and the position of the moving optical system 20, in which an abscissa represents a time (in second). For the angular velocity program, a velocity of the moving optical system 20 corresponding to the angular velocity of the clutch output shaft 9 is shown. Symbols t1 to t10 represent times.

As seen from the torque program shown at the top of FIG. 7, a constant transfer torque F is supplied through the F clutch 6 (see FIG. 6) irrespective of a difference between the rotating speed of the motor 2 and the rotating speed of the clutch output shaft 9 during a period between time 0 and time t1 so that the moving optical system 20 is moved at a constant acceleration. Thereafter, the transfer torque is gradually reduced in order to impart a predetermined equi-velocity motion to the moving optical system 20 and, after the time t2, a constant torque $\Delta T_1$ is maintained. The transfer torque is reduced by decreasing the exciting current (F clutch control current 56) supplied to the F clutch 6 (see FIG. 5). After the time t2, only the torque $\Delta T_1$ necessary to move the moving optical system at the constant velocity is applied. The constant velocity motion is imparted by the torque $\Delta T_1$ by overcoming a frictional force due to a rail on which the moving optical system 20 is mounted. Accordingly, the torque $\Delta T_1$ varies depending on a particular copying machine or the aging of a machine.

After the time t3, the transfer torque is reduced to zero in order to reversely drive the moving optical system 20, and then a negative transfer torque is applied (by supplying the exciting current to the B clutch 8) to apply a braking force. In the present embodiment, an exposure process is carried out during the period t2-t3. The torque program curve and the velocity program curve during the period t3-t5 represent the above. While the acceleration during the period t4-t6 is a negative constant, the transfer torque must be incremented in the negative direction at the time t5 because the direction of the frictional force is reversed when the moving optical system 20 is stopped and reversely driven. In other words, the frictional force during the deceleration of the moving optical system 20 and the frictional force during the backward movement are opposite in direction.

During the period t5-t6, the constant transfer torque is applied to rapidly accelerate the movement, but after the time t6, the transfer torque is gradually reduced, and after the time t7, a constant negative transfer torque $-\Delta T_2$ is maintained. The transfer torque $-\Delta T_2$ is necessary to impart the constant velocity motion while overcoming the frictional force of the moving optical system 20. Thereafter, the transfer torque is gradually increased in the positive direction in order to stop the moving optical system 20 at a home position (t8-t9). After the time t9, the transfer torque is increased in the negative direction to gradually reduce the acceleration to attain a smooth stop. Thus, the moving optical system 20 is stopped at the home position at the time t10. A curve shown at the bottom of FIG. 7 represents a displacement curve of the moving optical system 20. The period 0-t5 corresponds to the forward movement and the period t5-t10 corresponds to the backward movement.

The operation of the present unit is now explained with reference to FIGS. 4 and 7.

When a start command is issued from the command circuit 30, the programs for the scan speed corresponding to a copy magnification are selected. The F clutch 6 is coupled to the rotating motor 2 and then the constant exciting current is supplied to the F clutch 6 in response to the clock supplied from the encoder 12 to initiate the equi-acceleration motion, as explained above in connection with the acceleration program of FIG. 7. Then, the transfer torque is changed as shown in FIG. 7 to complete one reciprocal movement of the moving optical system 20. FIG. 7 shows the program by which the moving optical system 20 is stopped at the home position after one reciprocation cycle. When the moving optical system 20 is to be continuously moved over a plurality of reciprocation cycles, the transfer torque is kept constant after the time t9 and then the start transfer torque (transfer torque in the period 0-t1) is applied (as shown by a chain line on the upper right hand in FIG. 7)

The angular velocity at each time point at which the clock signal is supplied from the encoder 12 is compared with a predetermined angular velocity stored in the table 32 (see comparator 38), and the resulting phase difference signal 40 is converted to the compensation torque $\Delta T$ (see phase torque conversion circuit 42) and it is stored in the memory 46, as described before. This memory operation is repeated by a predetermined number of times during the constant velocity forward and backward movements (t2-t3 and t7-t8) of the moving optical system 20 or one of them (during the constant velocity forward movement or the constant velocity backward movement. The compensation torques of the predetermined number of times are accumulated and averaged, and the torque program is updated by the average (see torque offset signal 50). As a result, the constant torques $\Delta T_1$ and $\Delta T_2$ or one of them, which are free from the external disturbances, are stored in the torque conversion table 36 so that a torque variation due to the aging of the optical system guide rail and the pulley shaft (not shown) is corrected. The updating of the torque program is carried out prior to shipment of the unit from a plant or periodically by a service man.

Since it is necessary to change the scan speed of the moving optical system 20 in accordance with the copy magnification, an area A of a hatched area shown in the acceleration program of FIG. 7 is set to be slightly smaller than the acceleration program for the lowest scan speed. The scan speed is changed in accordance with the copy magnification by adjusting the period from the start to the time t1 (that is, the period of the constant acceleration motion). In other words, it is not necessary to change the torque program after the time t1 irrespective of the setting of the copy magnification.

In the present embodiment, the torque program is preset such that the moving optical system 20 reciprocates an effective moving distance of 230 mm in one second with a maximum acceleration of 15 m/sec$^2$ (approximately 1.5 G). At the start, the equi-acceleration motion is effected at 15 m/sec$^2$ (until t1), the acceleration is reduced at 0.3 m/sec in advance of the predetermined scan speed 0.445 m/sec (corresponding to the hatched area A of the acceleration program), that is, when the scan speed reaches 0.145 m/sec (t1-t2), and the predetermined scan speed 0.445 m/sec is reached when the acceleration is reduced to zero (t2). Similarly, the deceleration is started at 0.3 m/sec in advance of the constant velocity −1.2 m/sec in the backward movement (corresponding to the hatched area B of the acceleration program), that is, when the scan speed reaches −0.9 m/sec.

By setting the rotating speed of the motor 2 to be slightly higher than the predetermined rotating speed, the rotating speed corresponding to the exciting current is attained even if the rotating speed is slightly reduced by the fluctuation of a power supply. Since the constant speed in the forward movement is set to be higher than the constant speed in the backward movement, it is necessary to increase the input rotating speed to the B clutch 8 by adjusting the gear ratio of the reversal gear 10.

Figure 8:
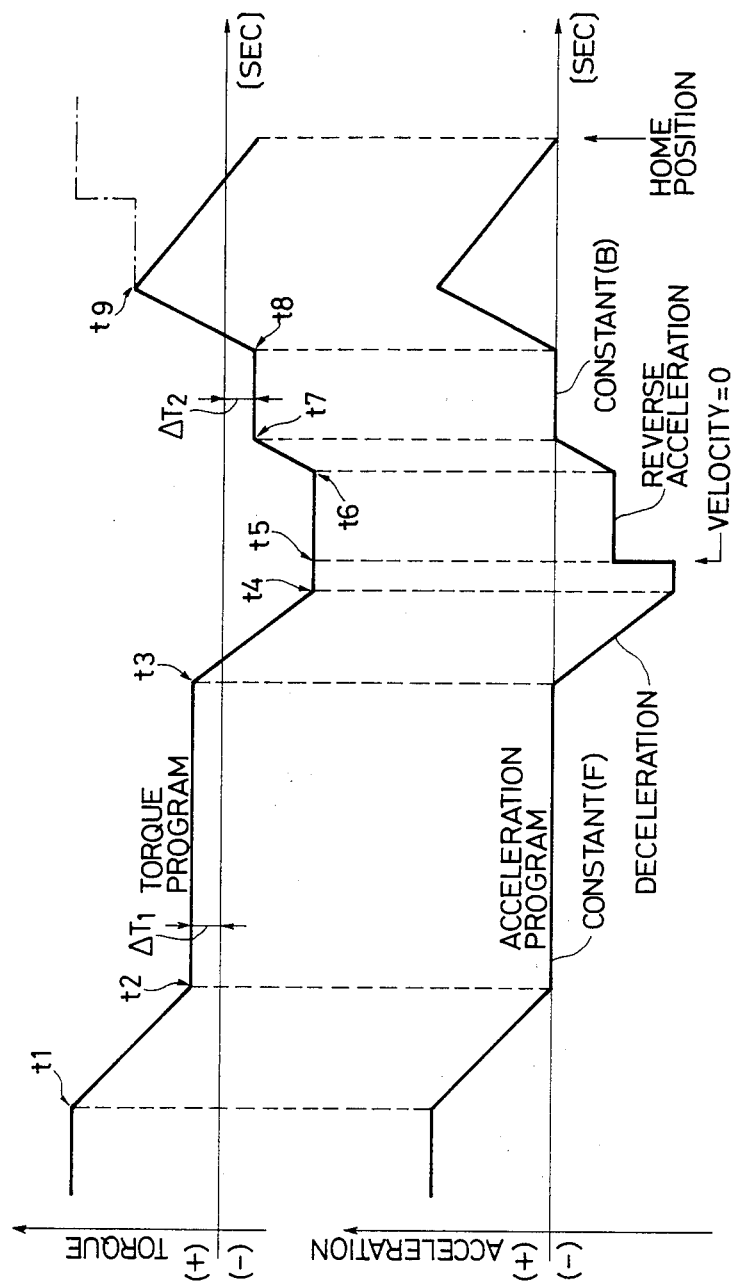
FIG. 8 shows another control program.

FIG. 8 shows another embodiment of the torque program. A difference between the torque program shown in FIG. 8 and that of FIG. 7 resides in that the transfer torque is kept constant during the period t4-t6. As a result, the acceleration changes stepwise around the time point (t5) at which the moving optical system 20 is temporarily stopped, although it does not pose a practical problem.

Figure 9:
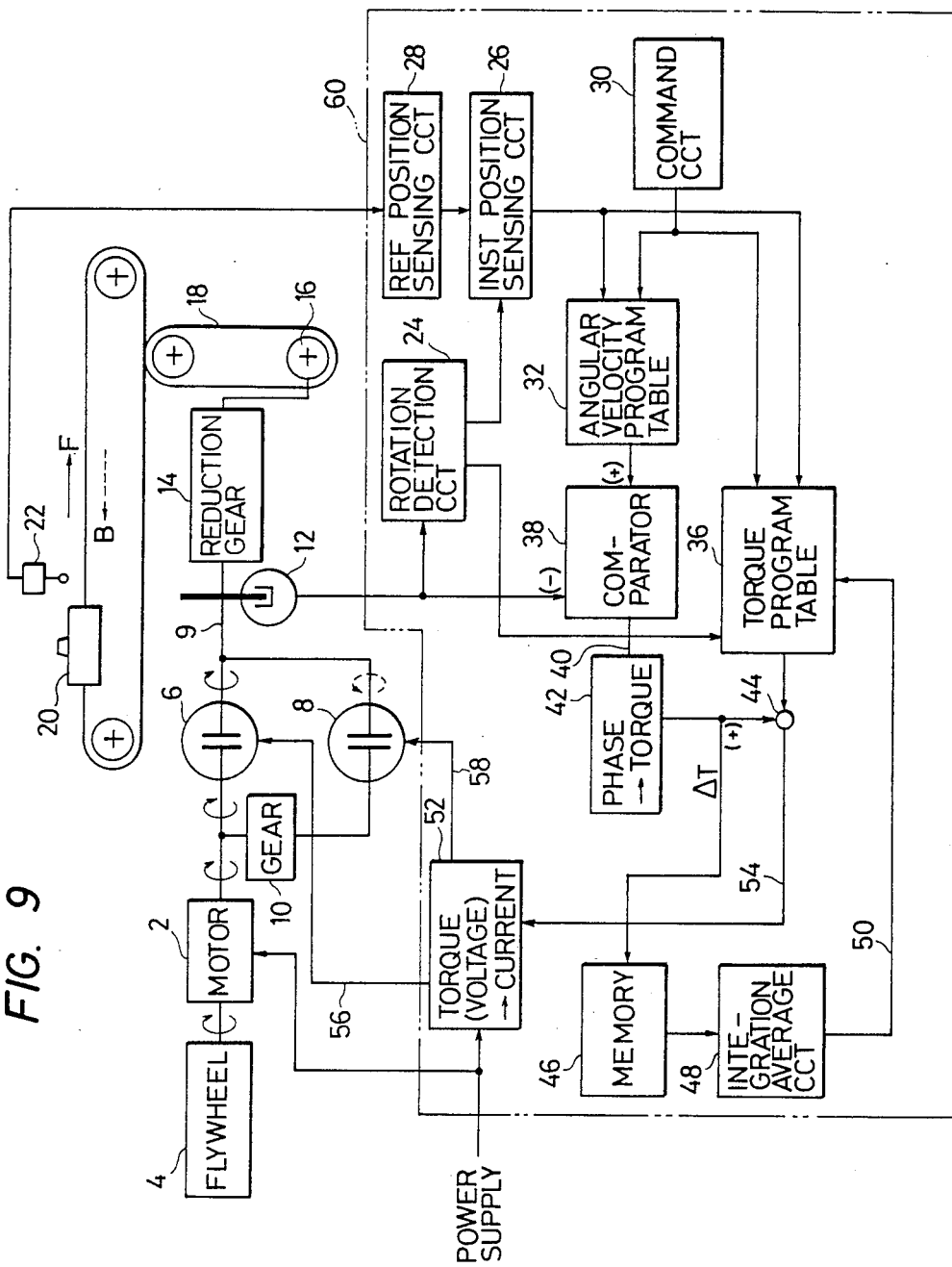
FIG. 9 shows a second embodiment of the present invention.

FIG. 9 shows another embodiment of the control unit for the moving optical system. A difference between FIG. 9 and FIG. 4 resides in the omission of the acceleration program. Since the torque is proportional to the acceleration, the predetermined movement control is attained by storing the torque program corresponding to the acceleration program. The other elements are identical to those shown in FIG. 4 and designated by the same numerals. The operation of the present unit is similar to that of FIG. 4 and hence the explanation thereof is omitted.

Figure 10:
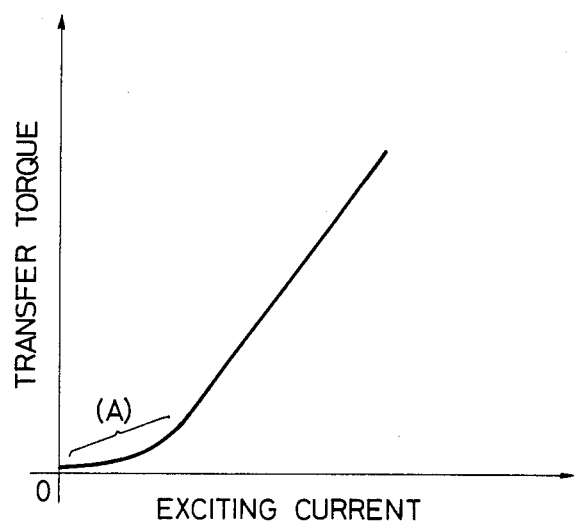
FIG. 10 shows a characteristic of the powder clutch in a vicinity of zero torque.
Figure 11:
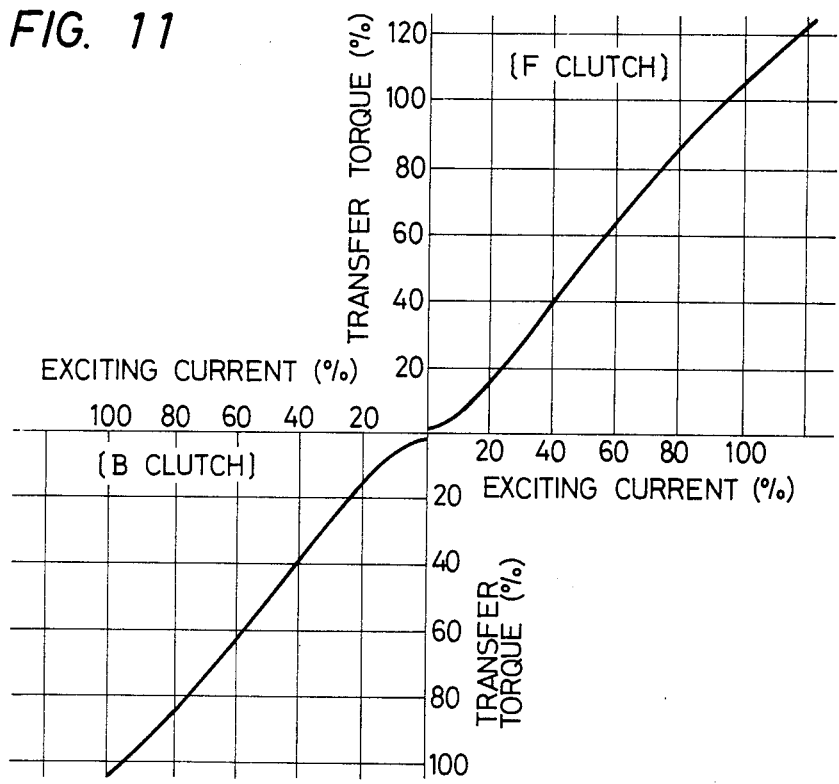
FIGS. 11 and 12 show compensation curves for the characteristics of the powder clutches shown in FIGS. 4 and 9, FIGS. 13, 14A, 14B and 15 show flow charts of control steps for the embodiments which use microcomputers.

FIG. 10 shows an enlarged view of the transfer torque versus the exciting current characteristic of the F cluth 6 or the B clutch 8 (see FIG. 4) in the vicinity of zero torque. Such a characteristic has been shown in FIG. 5. Since a region (A) in FIG. 10 exhibits a non-linear characteristic, it is preferable to compensate for the region (A) to impart a linearity. If the F clutch 6 and the B clutch 8 are switched without compensation, the transfer torque versus the exciting current characteristic is not linear as shown in FIG. 11 and a step appears in the vicinity of zero torque and the control is hard to attain.

Figure 12:
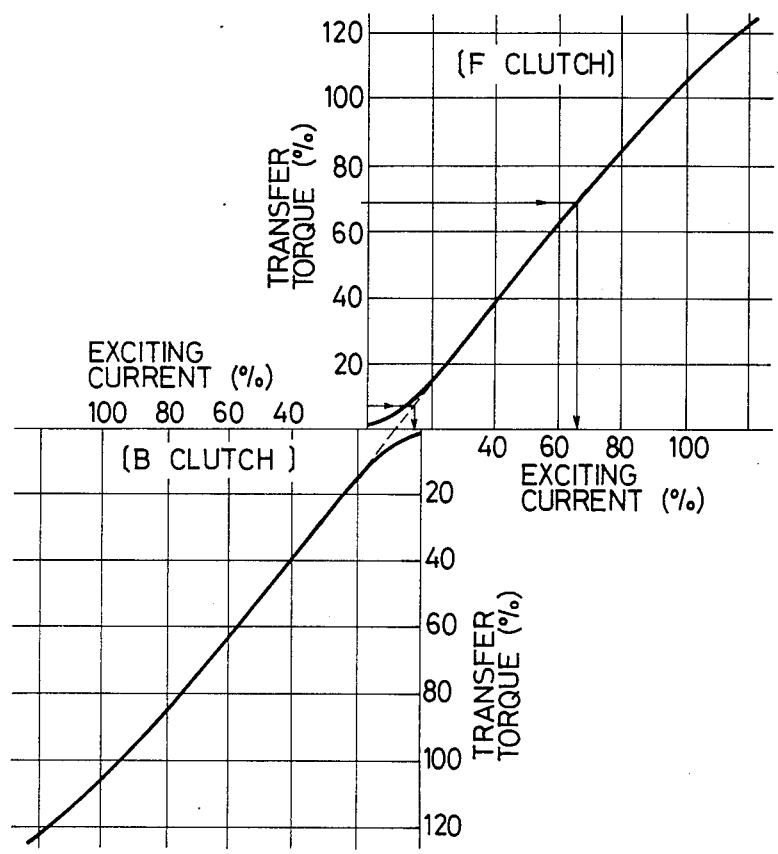

FIG. 12 shows a compensation method to inpart the linearity to the transfer characteristic of the clutch. In a small transfer torque range, the exciting currents are applied to both the F clutch 6 and the B clutch 8 so that the linearity as shown by a broken line is attained. Accordingly, it is necessary to supply substantially the same exciting current to both clutches 6 and 8 when the transfer torque is zero. In order to attain such a control, two compensating exciting currents (for the F clutch 6 and the B clutch 8) are stored for the small transfer torque range.

In the present embodiment, since the velocity control for the moving optical system 20 is effected on real time by using the table and the velocity is compensated each time when the clock is supplied from the encoder, a high precision velocity control is achieved. The present embodiment is particularly effective when the moving optical system is to be moved at a high speed.

Figure 13:
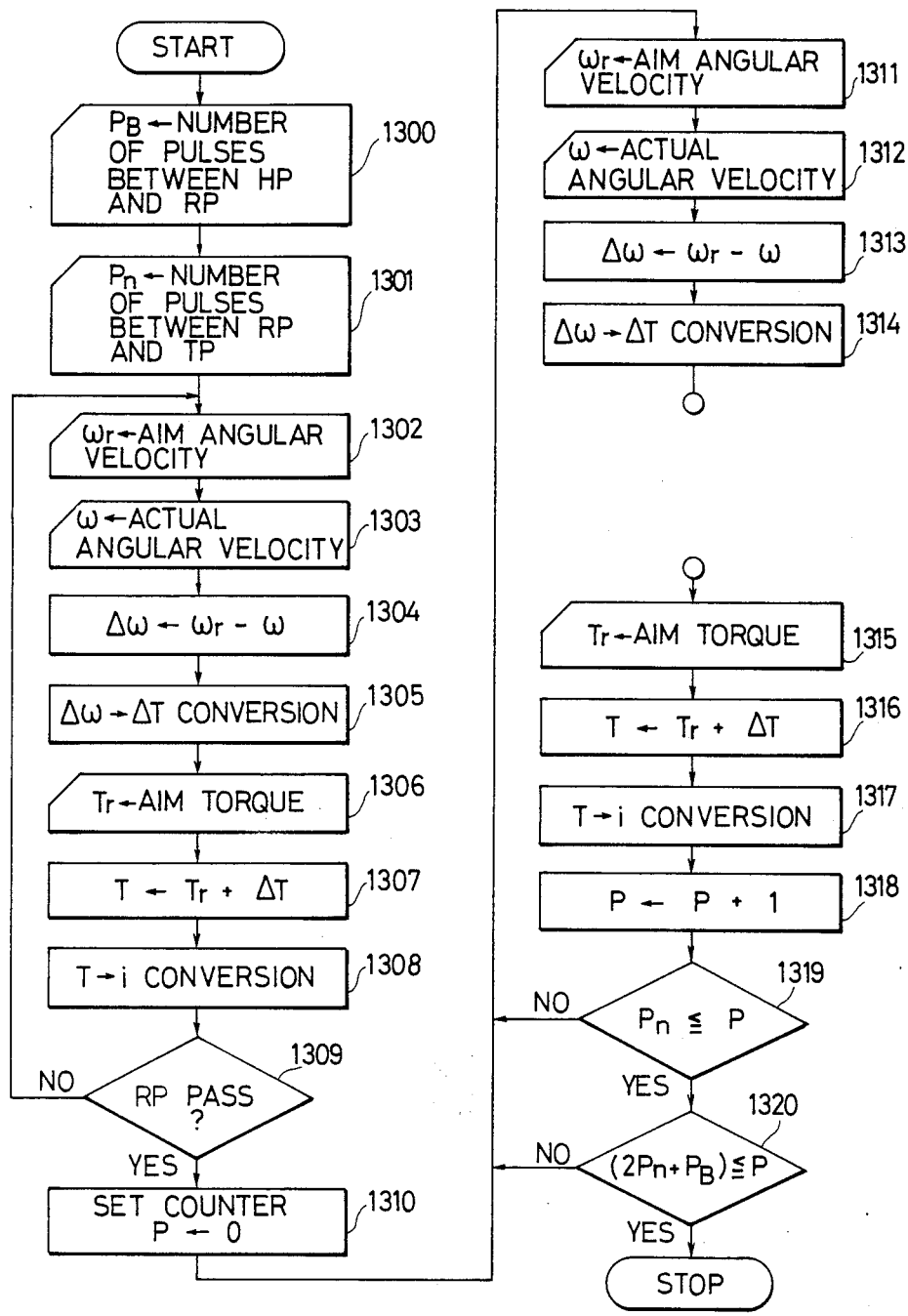
Figure 19:
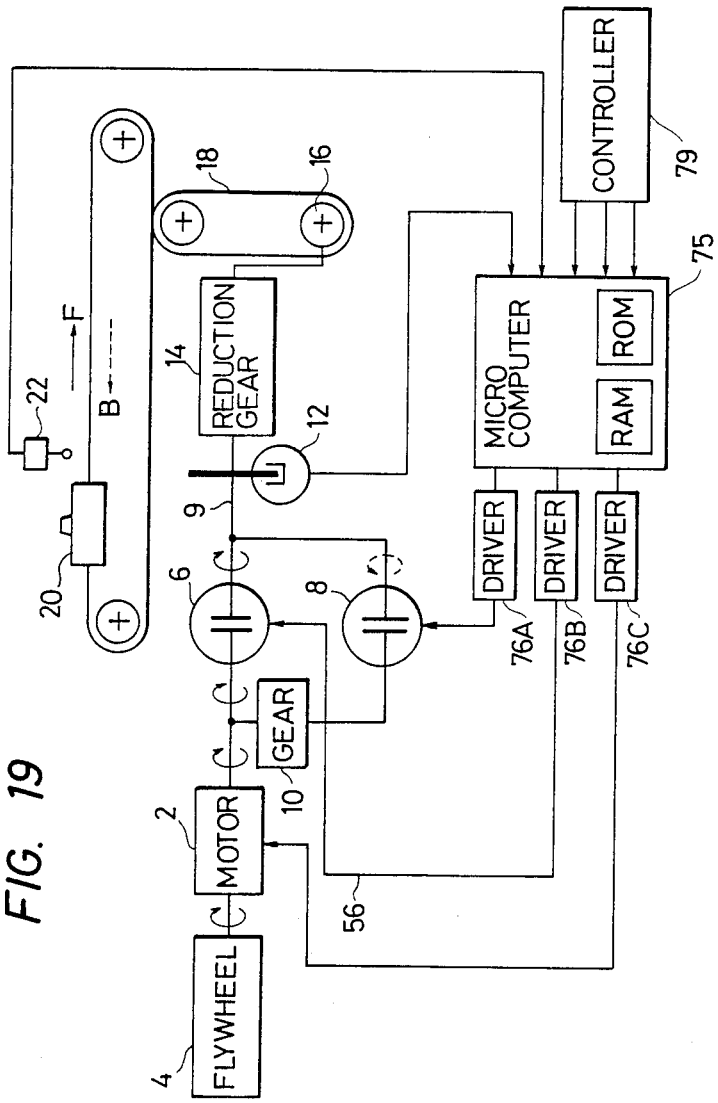
FIG. 19 shows an embodiment which uses a microcomputer.

Another embodiment of the present invention is now explained. FIG. 19 shows an embodiment which uses a microcomputer, and FIG. 13 shows a flow chart for controlling the moving optical system by a microcomputer 75 (including a RAM and a ROM). The flow chart shown is programmed and stored in the ROM of the microcomputer. It does not shown the control for a normal copy operation but shows only the control relating to the present embodiment.

In the present embodiment, the microcomputer 75 is used instead of the control circuit 60 shown in FIGS. 4 and 6. Referring to FIG. 19, connected to the microcomputer 75 are a driver 76C for driving the motor 2 and drivers 76B and 76A for driving the F clutch 6 and the B clutch 8, respectively. The clock signal from the encoder 12, the reference position signal from the reference position sensor 22 and the signals (copy start signal, magnification signal, etc.) from the control panel 79 are applied to the microcomputer 75.

The flow chart of FIG. 13 is now explained.

When a copy count is set and a copy start button (not shown) is depressed, the motor 2 is connected to the F clutch 6 and the moving optical system 20 starts to move forward. Thus, the clock pulse signal from the encoder 12 changes from a low state to a high state (or vice versa) and the following steps are carried out.

In a step 1300, the number $P_B$ of clock pulses corresponding to a distance from the home position to the reference position is read from the data table into the RAM of the microcomputer 75.

In a step 1301, the number $P_n$ of clock pulses corresponding to a distance from the reference position to the reversal position is read from the data table into the RAM of the microcomputer 75.

In a step 1302, a target angular velocity corresponding to the clock pulses (that is, the encoder clock pulses representing the position of the moving optical system 20) is read from the angular velocity program table of the RAM. If a memory area is insufficient because the date to be read in is too much, an operation result may be read in by using a multi-microprocessor (not shown) instead of reading the data from the table.

In a step 1303, actual angular velocity calculated based on the clock pulses from the encoder 12 is read in.

In a step 1304, a difference $\Delta\omega$ (compensation angular velocity) between the target angular velocity and the actual angular velocity is calculated.

In a step 1305, the compensation angular velocity $\Delta\omega$ is converted to a compensation torque $\Delta T$. The conversion may be done by multiplying a correction factor to a torque derived from the following dynamics formula.

Torque=(mass of moving optical system)
  x (radius of wire pulley)$^2$
  x (angular velocity)$^2$ Alternatively, it may be done by simply multiplying a conversion factor to the compensation angular velocity $\Delta\omega$.

In a step 1306, a target torque Tr is read from the torque conversion table of the RAM.

In a step 1307, the target torque Tr is added to the compensation torque $\Delta T$ to produce a control torque T (corresponding to the torque control voltage 54 in FIG. 4).

In a step 1308, the control torque T is converted to a control current for the F clutch 6 and a signal corresponding to the control current is supplied to the driver 76B. The drivers 76B and 76A can switch the control currents for the F clutch 6 and the B clutch 8 in accordance with the output from the microcomputer 75.

The steps 1302 to 1308 are repeated until the moving optical system 20 passes through the reference position (step 1309).

The steps 1302 to 1309 are cycled every time the clock pulse (one pulse or a divided pulse) is supplied from the encoder 12.

In a step 1310, a count P of a counter (not shown) is reset to zero.

In steps 1311 to 1317, the same process as that in the steps 1302 to 1308 is carried out.

In a step 1318, the count P of the counter is incremented by one in response to the output pulse from the encoder 12.

The loop of the steps 1311 to 1318 is repeated until the count P reaches the number $P_n$ of clock pulses (see the step 1301) corresponding to the distance from the reference position to the reversal position (step 1319).

The steps 1311 to 1318 are cycled every time the clock pulse is supplied from the encoder 12.

When the count P reaches $P_n$, the program proceeds to a step 1320 and the loop of the steps 1311 to 1319 is repeated until the count reaches $2P_n+P_B$ (corresponding to a distance from the reference position to the reversal position, thence to the home position).

When the count reaches $2P_n+P_B$, the program is terminated and the moving optical system 20 is stopped at the home position. In the present embodiment, the addresses of the angular velocity table and the torque conversion table of the RAM are advanced for each clock pulse from the encoder 12.

It may occur that the moving optical system 20 does not exactly return to the home position by various reasons such as operation precision of the F clutch 6 and the B clutch 8. As a result, the moving optical system 20 may be started up earlier or later than the predetermined time. However, since the reference position is sufficiently far from the home position, no correction of the control torque T is necessary. In other words, since the moving optical system 20 is at the predetermined constant velocity when it passes through the reference position, it is not necessary to exactly position the moving optical system 20 at the home position.

Figure 14A:
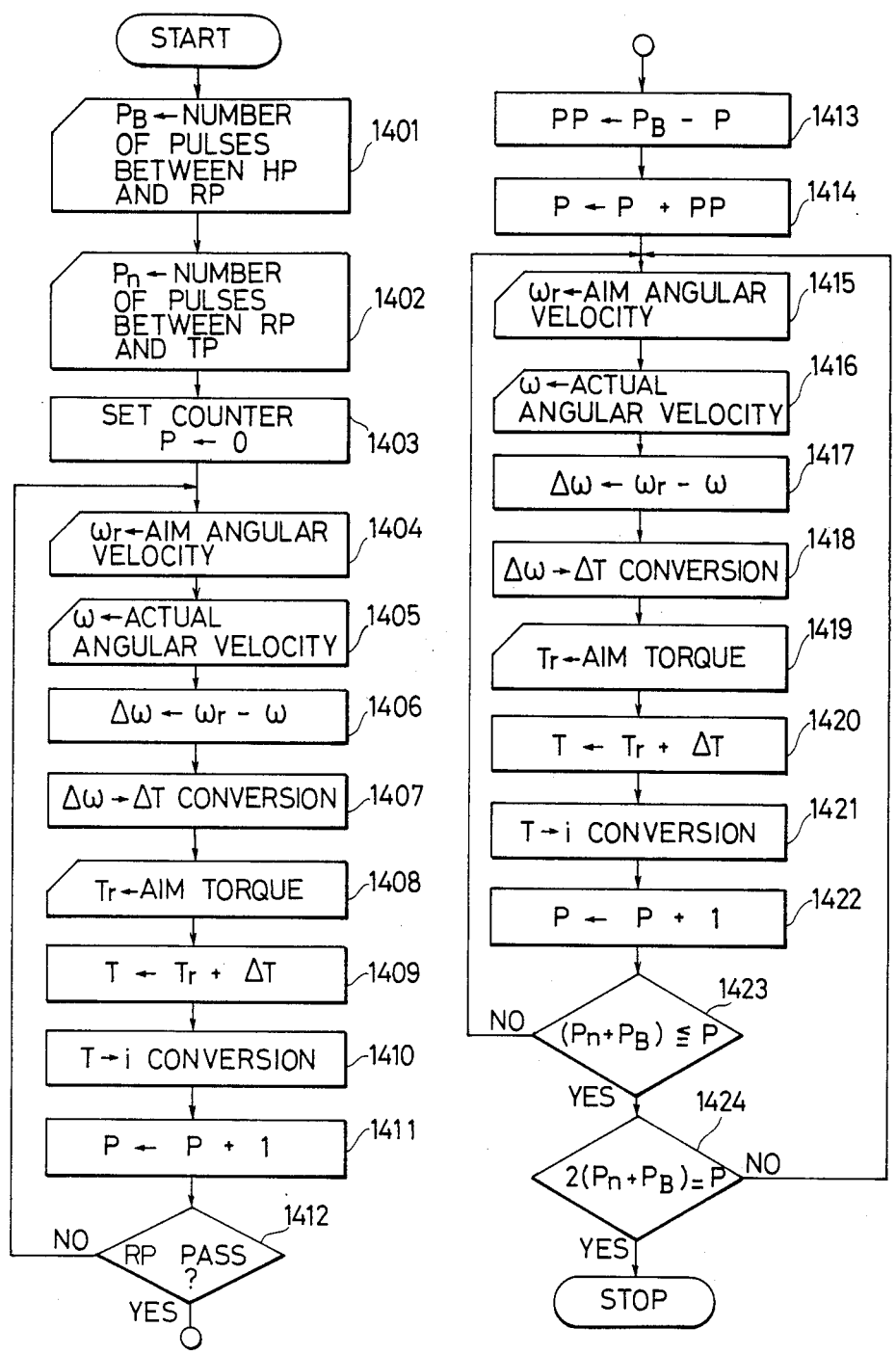

FIG. 14A shows another embodiment of the flow chart.

Steps 1401 and 1402 are identical to the steps 1300 and 1301 shown in FIG. 13, and hence they are not explained here.

In a step 1403, a count P of a counter (not shown) is reset to zero.

Steps 1404 to 1401 are identical to the steps 1302 to 1308 shown in FIG. 13, and hence they are not explained here.

In a step 1411, the count P of the counter is incremented by one in response to the output pulse from the encoder 12.

When the moving optical system passes through the reference position (step 1412, see the reference position sensor 22), a calculation $PP=P_B-P$ is done in a step 1413 so that a difference between an actual start position of the moving optical system 20 and the home position is calculated.

In a step 1414, a calculation $P=P+PP$ is done to set the counter to a count which would be obtained if the moving optical system 20 had started from the exact home position.

Steps 1415 to 1422 are identical to the steps 1404 to 1411 described above.

In a step 1423, it is checked if the moving optical system 20 has reached the reversal position.

Steps 1415 to 1423 are repeated until the arrival of the moving optical system 20 to the home position is detected in the step 1423.

Thus, the moving optical system 20 is stopped at the home position.

Figure 14B:
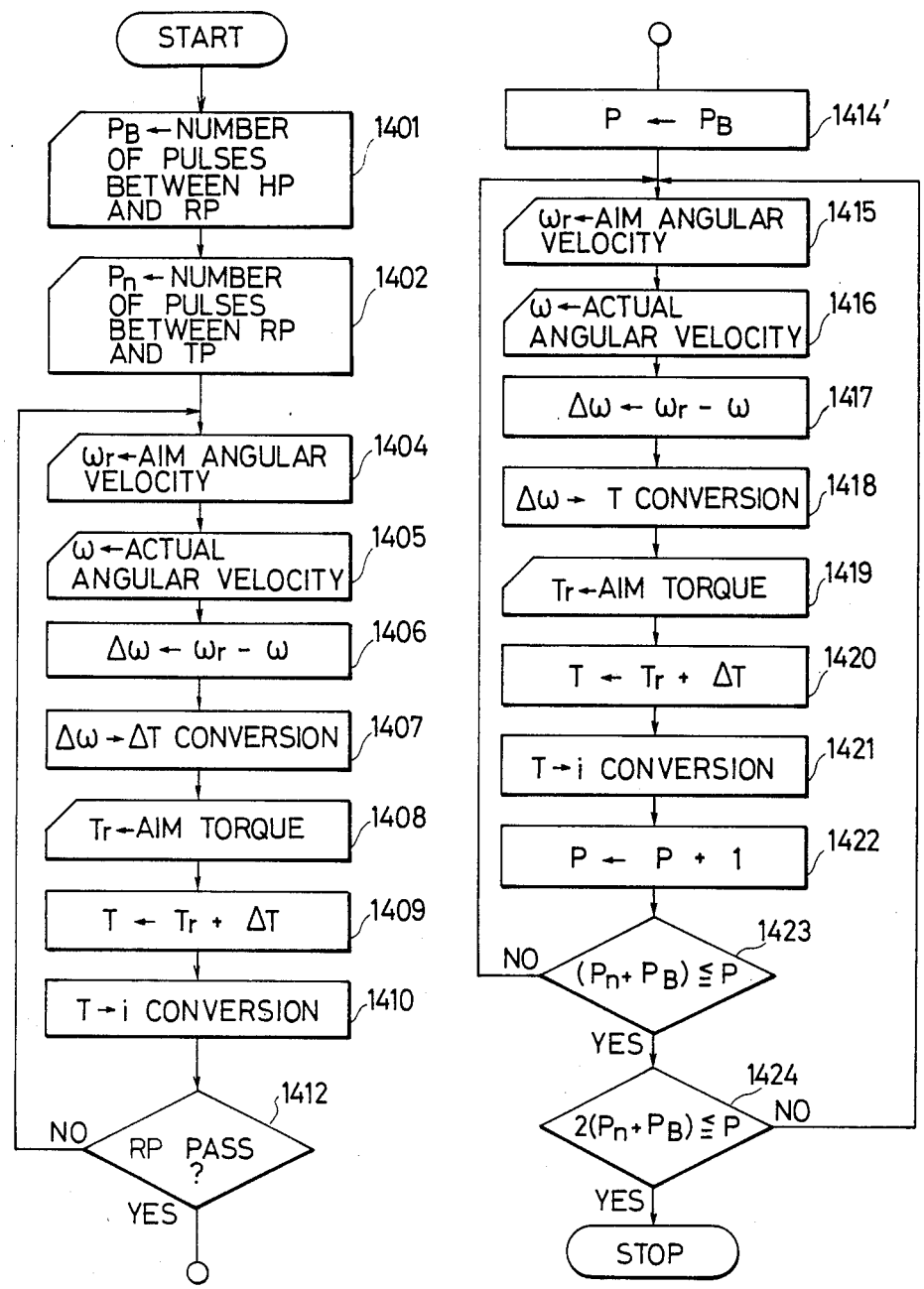

FIG. 14B shows a flow chart which is a modification of the flow chart shown in FIG. 14A. Differences between FIGS. 14B and 14A reside in:

(1) Elimination of the step 1403, and (2) Elimination of the steps 1413 and 1414 and addition of a new step 1414'($P_b P_B$)

The overall control concept is same as that of FIG. 14A.

Figure 15:
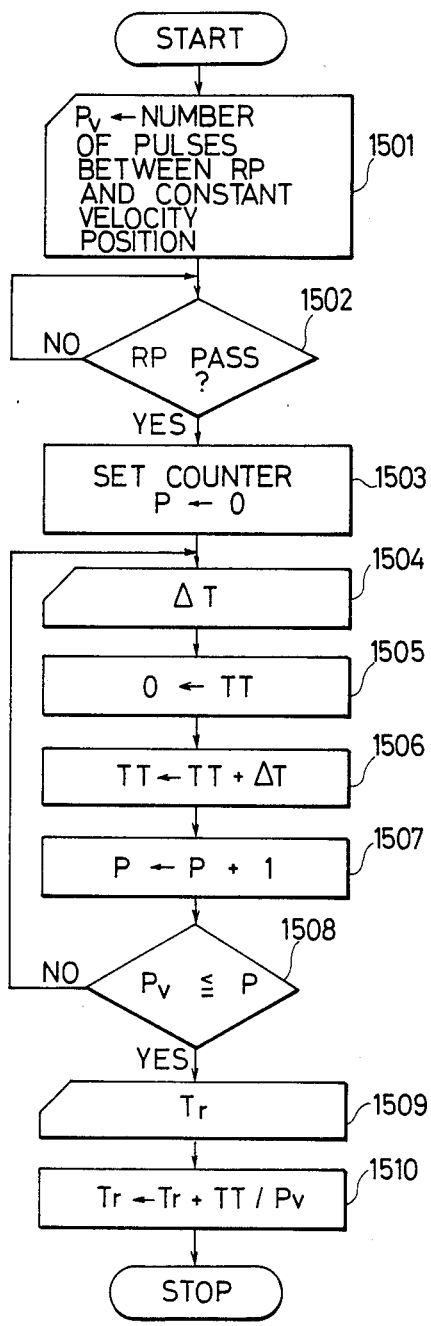

FIG. 15 shows a flow chart of steps for updating the torque program stored in the torque conversion table of the RAM in accordance with the compensation torque $\Delta T$.

In a step 1501, the number $P_y$ of encoder output pulses corresponding to a distance between the position of the moving optical system 20 immediately before the time t3 (see FIG. 7) and the reference position is read in.

In a step 1502, if the passage of the moving optical system 20 at the reference position is detected, a count P of a counter (not shown) is reset to zero (step 1503).

The compensation torque $\Delta T$ is read every time the pulse is supplied from the encoder 12 (step 1504) and the compensation torques $\Delta T$ are accumulated (steps 1505 and 1506). In and after the second routine, the step 1505 is omitted.

When the number of encoder pulses supplied after the passage of the reference position reaches $P_y$ (steps 1507 and 1508), the target torque Tr (stored in the torque conversion table) is read in (step 1509).

In a step 1510, an average $TT/P_y$ of the compensation torque $\Delta T$ is calculated and it is added to the target torque Tr. Thus, the updating of the torque conversion table is terminated.

The updating is carried out separately from an exposure operation and it may be carried out only during ten reciprocation cycles of the moving optical system 20.

In order to prevent excessive updating of the torque program, a correction factor may be multiplied to the average compensation torque in the following manner.

$$Tr \leftarrow Tr + k \cdot TT/P_y \quad 0 < k < 1$$

Figure 16:
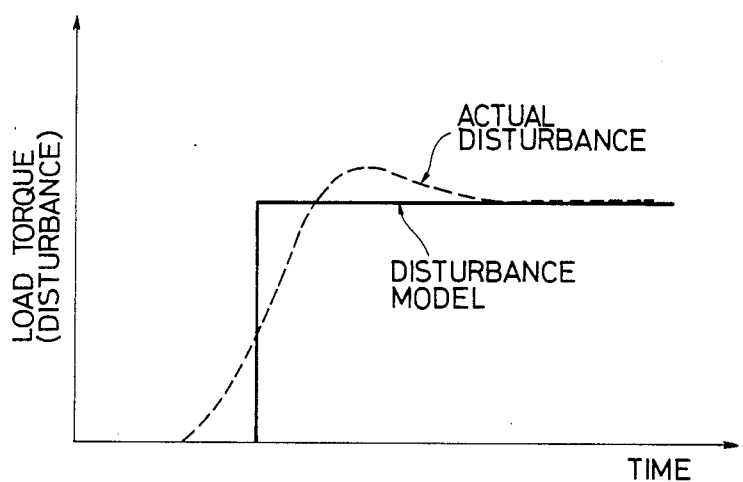
FIG. 16 shows an external disturbance model.
Figure 17:
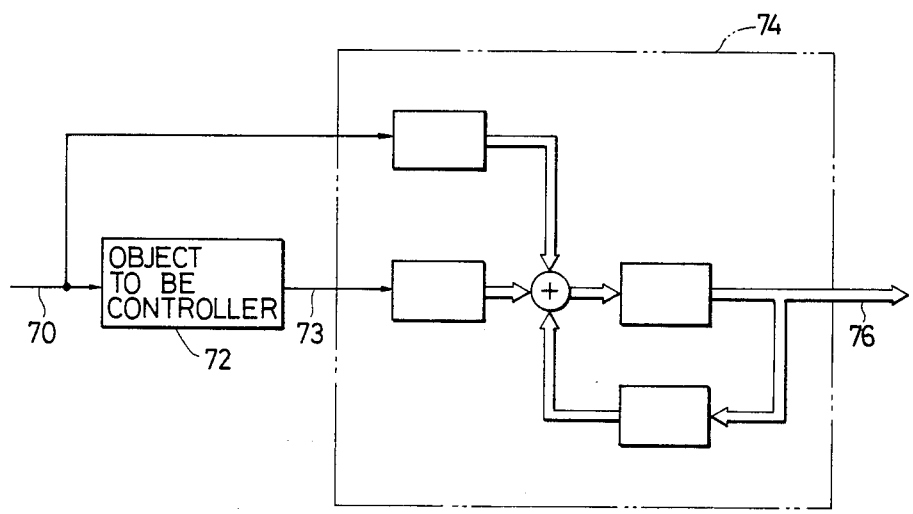
FIG. 17 shows a block diagram of a status detector.

FIG. 16 shows a status when a non-negligible disturbance is applied to the unit of the present embodiment. FIG. 17 shows a block diagram of a status detector which predicts the disturbance and supplies a disturbance compensation torque Tc.

Figure 18:
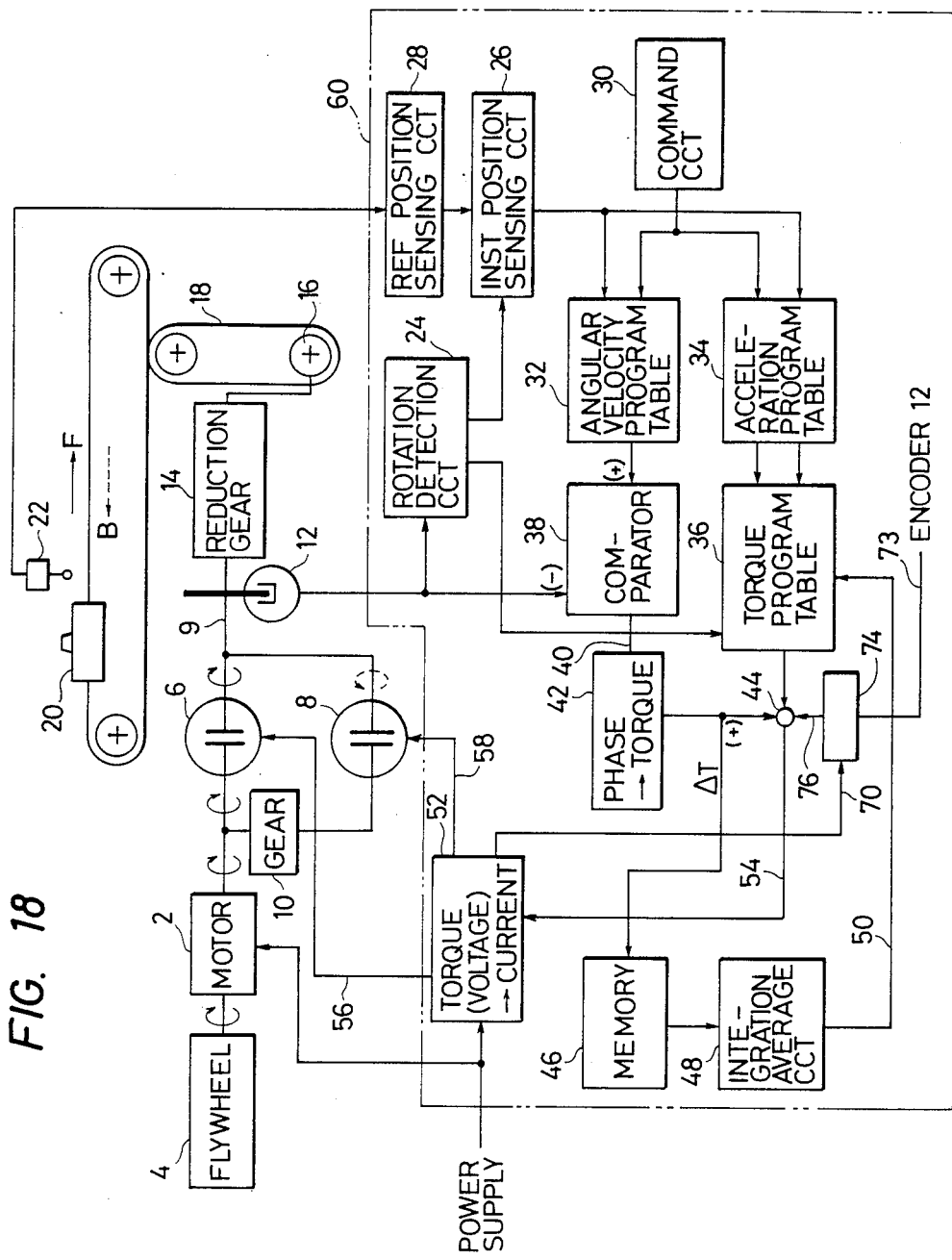
FIG. 18 shows a third embodiment of the present invention.

Assuming that the disturbance is applied stepwise as shown in FIG. 16, it is important to quickly detect a height thereof. The status detector prepares a mathematic model of the motor system and a mathematic model (status equation) of the disturbance, and calculates the amount of disturbance based on an actual input data (see, for example, page 279 of "System Control Theory" by M. Satoh). Referring to FIG. 17, numeral 70 denotes a system input, numeral 72 denotes an object to be controlled, numeral 73 denotes a system output, numeral 74 denotes a status detector for detecting the disturbance and numeral 76 denotes a disturbance compensation torque. The system input 70 (input corresponding to the F clutch control current 56 or the B clutch control current 58) and the system output 73 (output from the encoder 12) are applied to the status detector 74 as shown in FIG. 18. Thus, the F clutch 6 or the B clutch 8 is the object to be controlled.

In FIG. 18, the status detector 74 is added to the embodiment shown in FIG. 4. Thus, the torque control voltage 54 is a sum of the compensation torque ΔT (voltage), the torque (voltage) read from the torque conversion table 36 and the disturbance compensation torque 76 (voltage). The other operations are the same as those in FIG. 4.

The status detector 74 may be implemented by a hardware in order to increase the operation speed and reduce the cost. It may be implemented by a software by using a multi-microprocessor in order to enhance the reliability.

In the embodiments described above, the control circuit may be constructed by a one-chip microcomputer, or a hardware circuit in order to increase the operation speed and reduce the cost.

As described hereinabove, in accordance with the present invention, the position, velocity and acceleration of the moving body can be exactly controlled in accordance with the preset program. Accordingly, the present invention is particularly useful to rapidly and smoothly control the movement of the moving body such as the optical system.

The present invention is not limited to the illustrated embodiments but various modifications may be made within the scope of the claims.

What we claim is:

1. A control unit for a moving body, comprising:
    a moving body;
    a motor for driving said moving body in response to drive data;
    means for detecting a velocity of said moving body and generating velocity data;
    means for detecting a position of said moving body and generating position data; and
    means for controlling said moving body in accordance with the velocity data from said velocity detection means and the position data from said position detection means,
    said control means including:
    first storage means for storing preset target velocity data for controlling said moving body in accordance with the position data from said position detection means;
    second storage means for storing preset drive data for driving said motor in accordance with the position data from said position detection means independently of said target velocity data;
    means for comparing the velocity data from said velocity detection means and the target velocity data; and
    means for outputting correction data for correcting the drive data in accordance with an output from said comparing means.

2. A control unit for a moving body according to claim 1, wherein said control means includes means for updating the drive data in said second storage means in accordance with correction data from said correction data outputting means.

3. A control unit for a moving body according to claim 1, wherein the drive data includes torque data for driving said motor.

4. A control unit for a moving body according to claim 1, further comprising means for inputting data into said unit associated with a driving state of said moving body, wherein said first storage means outputs the target velocity data on the basis of the position data and the data from said input means.

5. A control unit for a moving body according to claim 4, wherein said second storage means outputs the drive data on the basis of the position data and the data from said input means.

6. A control unit for a moving body, comprising:
    a moving body;
    drive means for driving said moving body in response to drive data;
    means for storing preset drive data for said drive means;
    detection means for detecting a moving velocity of said moving body;
    comparing means for comparing the moving velocity with predetermined velocity data;
    means for converting an output from said comparing means into data relating to the drive data independently of said storage means; and
    means for updating the stored drive data in said drive data storage means on the basis of the data relating to the drive data.

7. A control unit for a moving body according to claim 6, further comprising memory means for storing the data relating to the drive data.

8. A control unit for a moving body according to claim 7, wherein said updating means updates the drive data on the basis of an average value of the data relating to the drive data stored in said memory means.

9. A control unit for a moving body according to claim 6, further comprising means for detecting a position of said moving body, wherein the predetermined velocity data is adapted to change in accordance with an output from said position detection means.

10. A control unit for a moving body, comprising:
    a moving body;
    means for driving said moving body;
    means for detecting a position of said moving body;
    means for outputting target velocity data of said moving body in response to an output from said position detecting means; and
    means for outputting drive data for driving said moving body in response to an output from said position detecting means, independently of said target velocity data.

11. A control unit for a moving body according to claim 10, wherein said target velocity data output means has a table for storing the target velocity data in advance of said driving means driving said moving body.

12. A control unit for a moving body according to claim 10, wherein said drive data output means has a table for storing the drive data in advance of said driving means driving said moving body.

* * * * *

UNITED STATES PATENT AND TRADEMARK OFFICE
CERTIFICATE OF CORRECTION

PATENT NO. : 4,748,555
DATED : May 31, 1988
INVENTOR(S) : HIROYUKI MIYAKE ET AL.

It is certified that error appears in the above-identified patent and that said Letters Patent is hereby corrected as shown below:

COLUMN 1

Line 15, "a" (both occurrences) should be deleted.
    Line 42, "exceed" should read --exceeds--.

COLUMN 2

Line 60, "other" should read --another--.

COLUMN 6

Line 41, "movement." should read --movement).--.

COLUMN 7

Line 43, "F cluth 6" should read --F clutch 6--.
    Line 53, "inpart" should read --impart--.

COLUMN 8

Line 9, "shown" should read --show--.
    Line 56, "Alternatively," should begin a new paragraph.

COLUMN 9

Line 53, "Steps 1404 to 1401" should read --Steps 1404 to 1410--.

UNITED STATES PATENT AND TRADEMARK OFFICE
CERTIFICATE OF CORRECTION

PATENT NO. : 4,748,555
DATED : May 31, 1988
INVENTOR(S) : HIROYUKI MIYAKE ET AL.

It is certified that error appears in the above-identified patent and that said Letters Patent is hereby corrected as shown below:

COLUMN 10

Line 15, "step 1414'($P{\flat}P_B$)" should read --step 1414' ($P{\leftarrow}P_B$).--.

Line 49, "$Tr{\leftarrow}Tr+k.TT/P_v o<k<1$" should read --$Tr{\leftarrow}Tr+k.TT/P_v$  $o<k<1$--.

COLUMN 12

Line 30, "storage" or --storing--.

SHEET 14

Figure 17, "OBJECT TO BE CONTROLLER" should read --OBJECT TO BE CONTROLLED--.

Signed and Sealed this

Fifth Day of September, 1989

Attest:

DONALD J. QUIGG

Attesting Officer

Commissioner of Patents and Trademarks